UNITED STATES PATENT OFFICE.

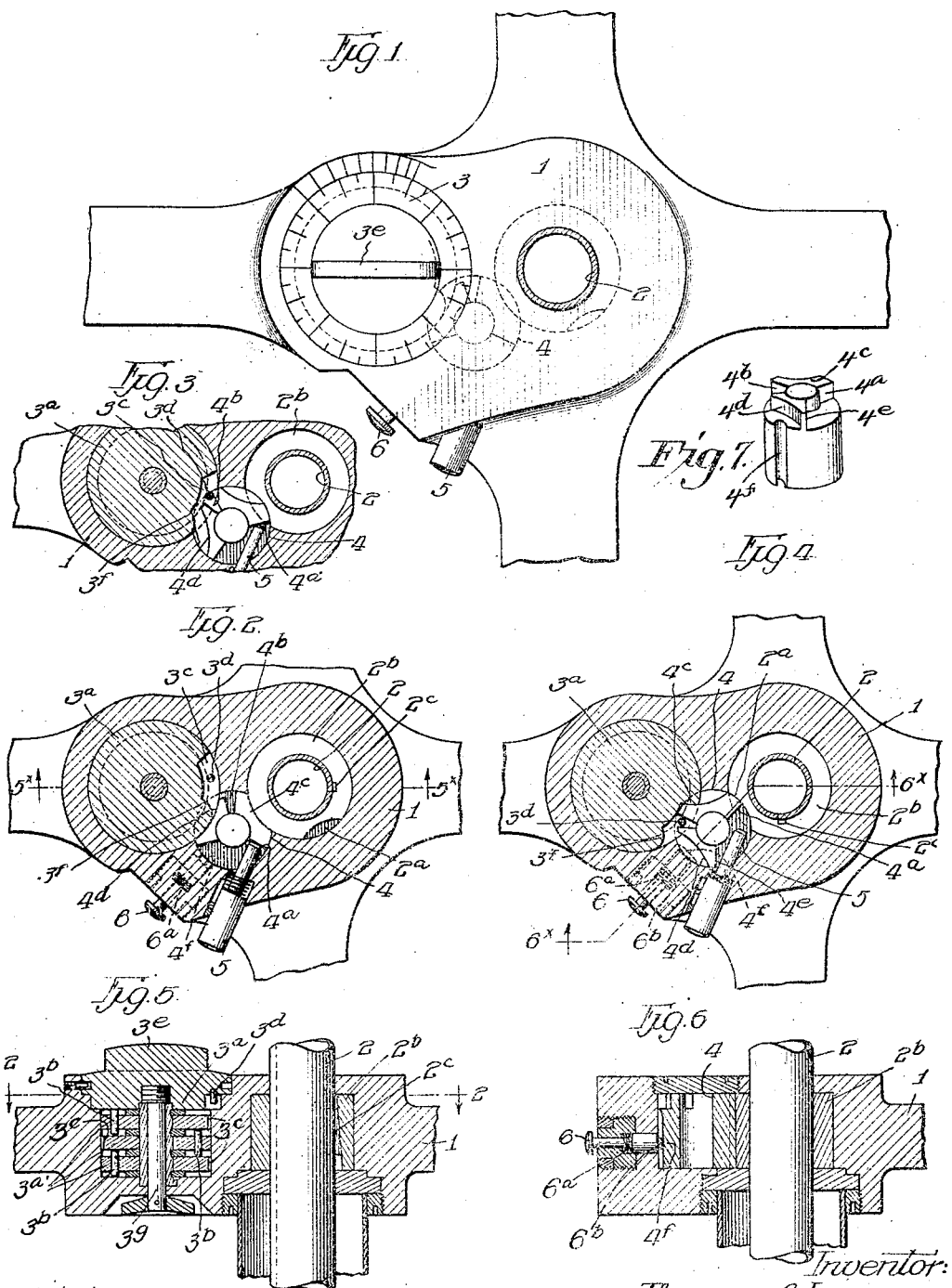

THOMAS C. LONNEY, OF CHICAGO, ILLINOIS, ASSIGNOR OF ONE-HALF TO ELGIN D. SHUPERT, OF CHICAGO, ILLINOIS.

STEERING-HEAD LOCK.

1,381,206. Specification of Letters Patent. Patented June 14, 1921.

Application filed March 11, 1920. Serial No. 364,885.

*To all whom it may concern:*

Be it known that I, THOMAS C. LONNEY, a citizen of the United States, residing at Chicago, in the county of Cook and State of Illinois, have invented certain new and useful Improvements in Steering-Head Locks, of which the following is a specification.

This invention relates to a lock-controlled driving connection for establishing and interrupting driving connection between a shaft and its wheel, for instance, the steering shaft of an automobile and the hand wheel through which it is controlled, so that by locking the connection out of service and leaving the wheel free to revolve upon the steering shaft, it becomes impossible to direct the course of the vehicle and therefore hinders unauthorized use thereof.

A primary object of the invention is to provide an improved locking mechanism embodying in its organization a rotary tumbler, preferably with permutation control, and the invention proceeds upon the principle of interposing a bolt, preferably a rotary bolt, between the tumbler and the shaft in such manner that the bolt becomes a means for transmitting the drive between the wheel and the shaft, and the tumbler merely controls, rather than constitutes, the driving connection and is therefore relieved of any of the stresses due to transmitting drive from the wheel to the shaft; the tumbler positively locks the bolt against assuming the driving position, thereby making the lock safer for the main purpose for which it is intended; and the arrangement permits the use, if desired, of an independent actuating means through which to cast the bolt, and also, if desired, independent means for firmly seating the bolt in locking position.

In carrying out this part of the invention, the bolt, preferably a rotary member, is placed in position to intersect the perimeters of both the tumbler and a member rigid with the shaft; such rigid shaft member and bolt on the one hand, and the bolt and tumbler on the other hand being reciprocally recessed so that each may enter the other in a manner to arrest or permit turning of the bolt as may be required in making the bolt control the shaft member and the tumbler control the bolt.

A further object is to provide the means for relieving the tumbler or permutation lock mechanism of the duty of engaging the bolt with the steering shaft, and therefore a further feature of the invention consists in providing a tripping device, preferably in the form of a push pin, which will at least initiate the entry of the bolt into driving engagement with the shaft; the arrangement being preferably such that such initial movement brings the bolt in position to be engaged by a master tumbler on the permutation lock so that the latter can complete the throw of the bolt to driving position.

Still another object is to provide a seating means for pressing the bolt into intimate contact with the parts which it is to connect, when in driving position, so as to prevent lost motion or back-lash between the hand wheel and the shaft, but which means is adapted to be withdrawn from control of the bolt so as to facilitate movement of the latter to releasing or non-drive position. The seating means preferably consists of a plunger pressing radially against the bolt under action of a spring, and seated in a recess of the bolt so that it not only presses the bolt to a firm seating in the wheel and shaft but resists tendency of the bolt to rotate out of drive position.

The invention will be fully understood upon reference to the accompanying drawing, in which one embodiment is disclosed by way of illustration. In said drawing—

Figure 1 is a fragmentary view of the hub portion of a steering wheel and the steering shaft upon which it is mounted, and in which the subject-matter of the present invention is embodied.

Figs. 2, 3, and 4 are horizontal sectional views taken in the plane of the line 2—2 of Fig. 5, disclosing the internal mechanism in three different positions, namely, with the locking bolt in releasing or non-driving position; with the engagement of the locking bolt and steering shaft initiated by the push pin and the bolt in reach of the master tumbler for completing such engagement; and with the engagement of the locking bolt and steering shaft completed by the master tumbler.

Fig. 5 is a section in a plane passing through the axes of the steering shaft and permutation lock spindle as indicated by the line $5^\times$—$5^\times$ in Fig. 2; and Fig. 6 is a section taken in a plane which passes through the axis of the steering shaft and through the seating plunger, as indicated by the line 6ˣ—6ˣ in Fig. 4.

Fig. 7 is a perspective view of the rotary bolt.

1 represents the hub of a steering wheel, and 2 a steering shaft which is to be controlled thereby in steering a motor driven vehicle. According to the present invention the hub 1 is mounted to rotate freely upon the shaft 2, and has its driving connection with the latter established or interrupted at will, so that when the vehicle is left unattended its steering wheel can be thrown out of service and the vehicle cannot be stolen. The purpose of the invention is to prevent unauthorized reëstablishing or driving connection, and to that end a tumbler mechanism 3, preferably of rotary type and in the form of permutation tumblers, is mounted upon one of the members to be interlocked, and a bolt 4, which serves as the means for interlocking the wheel and shaft, is interposed between the tumblers and the shaft or otherwise positioned with its perimeter intersecting the perimeters of the tumblers and of the shaft member, and made to control the interlock or driving connection while the tumbler controls it.

Bolt 4 is carried in the hub of the wheel, and to permit it to interlock the hub with shaft 2, the bolt is in the form of a mutilated cylinder adapted to rotate to present its cylindrical surface to a recess $2^a$ in a shaft member preferably in the form of a sleeve $2^b$ which, while carried in the wheel, receives the key $2^c$ of the shaft 2, so that the wheel, with the shaft member, bolt, and lock, can be applied to the end of the shaft as a unit.

In order that the rotary bolt may retire from the controlling to the releasing relation to shaft-member $2^b$, said bolt is recessed at $4^c$ to receive the cylindrical surface of the shaft member as shown in Fig. 2, and when the bolt is in this position the steering head is out of service.

In order that the rotary bolt 4 may be controlled by the tumbler mechanism 3, the latter is provided with a master tumbler $3^a$ and adjustable tumblers $3^{a'}$, which tumblers are nested upon the spindle $3^g$ and connected entrain through means of pins $3^b$, as is usual with permutation locks. By comparison of Figs. 5 and 6 it will be seen that the bolt 4 corresponds approximately in axial dimension with the nest of tumblers $3^a$, $3^{a'}$; and as shown in Figs. 2, 3, 4, the bolt 4 has an arcuate recess $4^d$ that is in position to receive the periphery of the tumblers when the bolt recess $4^e$ is receiving the shaft member $2^b$, and thus the lock prevents rotation of the bolt to restore the driving connection, until the tumblers are assembled to present their gates $3^e$ in position to admit the full diameter of the bolt, which of course can only be done by working the combination of the lock.

To relieve the lock 3 of the duty of initiating engagement of the periphery of bolt 4 with the recess $2^a$ of steering shaft 2, and for tripping the bolt into position to be picked up by the pin $3^d$ of the master tumbler, the device preferably embodies in its organization the additional feature of a push pin 5 adapted to engage a shoulder $4^a$ of the bolt 4 when the parts are in the position of Fig. 2, and start the arcuate surface of the bolt into the segmental recess $2^a$ of the shaft 2 (the wheel having now been revolved on the shaft to the position of Fig. 3). If rotation of the wheel is not stopped with accuracy in relation to the shaft member, the push pin will complete the registry of the bolt and recess without imposing this duty upon the lock 3. This brings the bolt to the initial shaft-engaging position of Fig. 3. Preferably the rotary bolt 4 is provided with a gate $4^b$ adapted to receive the pin $3^d$ on the master tumbler $3^a$ after the bolt has been moved to the limit of the throw of the push pin 5, so that after engagement of the bolt 4 with recess $2^a$ has been thus initiated, completion of the interlocking movement of the bolt may be effected by turning the master tumbler from the position of Fig. 3 to the position of Fig. 4. In this last-named movement, the master tumbler has carried with it the bolt 4 through engagement of pin $3^d$ with the bolt gate $4^b$, and the parts have been brought to a positive stop by the end of the tumbler gate $3^e$ bringing up against the segmental recess $4^c$ of the bolt, and by the shoulder $4^e$ of the bolt striking against the push pin 5. The wheel will now be in service condition.

To hold the bolt firmly to its seat in the segmental recess $2^a$ of the shaft, the seating plunger 6 pressed normally inward by spring $6^a$ has its inner end $6^b$ pressed firmly against the bolt 4 so that all lost motion between the wheel and the shaft will be absorbed and no back-lash will be permitted. To render the seating plunger 6 still more effective, the end $6^b$ is preferably made to enter a recess $4^f$ formed in the bolt to receive it, and this enables the seating plunger to resist any tendency of the bolt to move out of interlocking position when the wheel is being used to steer the car.

The parts remain in the position of Fig. 4 so long as it is desired to retain the wheel in service condition. If it be desired to throw the wheel out of service, it is simply necessary to turn the tumbler mechanism 3, through the medium of its finger-piece $3^e$, counter-clockwise from the position of Fig. 4 (seating plunger 6 being held out from the seat $4^f$ momentarily). The movement of the master tumbler $3^a$ will rotate the bolt 4 at first by the action of the pin 3ᵈ in bolt gate 4ᵇ, and thereafter by impingement of the rounded rear wall 3ᶠ of the tumbler against wall of bolt recess 4ᵈ to bring the bolt to the position of Fig. 2, when the wheel will be free to turn upon the shaft 2 and it will be impossible to steer the vehicle. Since by this movement of the tumbler mechanism the tumblers have been disarranged and the circular portions of the several tumblers will now lie in the recess 4ᵈ of the bolt, the bolt will be locked in the out-of-service position, and it will be impossible to restore driving condition except by manipulation of the permutation means 3. Thus the unauthorized use of the car will be prevented.

It is to be understood that while I have herein referred to the coacting element of the shaft as a shaft member, and have illustrated this term by the representation of the sleeve 2ᵇ, the term is to be interpreted as indicating the shaft itself or any portion or adjunct thereof, or any other part adapted to enter into the described relationship to the wheel and its locking bolt.

I claim:

1. A permutation lock-control for a shaft and its wheel, comprising a rotary bolt carried by one of said members and adapted to control the driving connection between them, and a series of rotary tumblers each adapted to intersect the periphery of said rotary bolt and positively hold it in position to prevent drive of the shaft by the wheel.

2. The combination of a shaft, a wheel mounted to rotate upon said shaft, a rotary bolt carried by said wheel and adapted to move into and out of intersection with the shaft to control movement of the wheel relatively to the shaft, and a series of rotary tumblers positively holding said bolt; said bolt having a recess that permits its intersection by said tumblers to lock the bolt against rotation; and said tumblers having recesses adapted to be assembled to permit rotation of the bolt.

3. A lock-controlled driving connection for a wheel and its shaft, comprising a shaft, a rotary tumbler, and a rotary bolt positioned with its perimeter intersecting both the shaft and the tumbler; said shaft and bolt being each recessed to permit it to receive the periphery of the other for interlocking and releasing the shaft member at will; and said bolt being recessed to receive the tumbler and prevent rotation of the bolt until the tumbler is set; the recess of the bolt being located to receive the tumbler while the bolt is receiving the shaft.

4. A lock-controlled driving connection for a wheel and its shaft, comprising a shaft, a rotary master tumbler, and a rotary bolt positioned with its perimeter intersecting both the shaft and said master tumbler; said shaft and bolt being each recessed to permit it to receive the periphery of the other for interlocking and releasing the shaft member at will; and said bolt being recessed to receive the master tumbler and prevent rotation of the bolt until the master tumbler is set, the master tumbler having a plurality of permutation tumblers associated therewith in the control of the bolt.

5. A lock-controlled driving connection for a wheel and its shaft, comprising a shaft, a rotary tumbler, and a rotary bolt positioned with its perimeter intersecting both the shaft and the tumbler; said shaft and bolt being each recessed to permit it to receive the periphery of the other for interlocking and releasing the shaft member at will; and said bolt being recessed to receive the tumbler and prevent rotation of the bolt until the tumbler is set, the tumbler having a gate presented by rotation of the tumbler to admit a portion of the bolt to intersection of the tumbler in changing the relation of the bolt to the shaft.

6. A lock-controlled driving connection for a wheel and its shaft, comprising a shaft, a rotary tumbler, and a rotary bolt positoned with its perimeter intersecting both the shaft and the tumbler; said shaft and bolt being each recessed to permit it to receive the periphery of the other for interlocking and releasing the shaft member at will; and said bolt being recessed to receive the tumbler and prevent rotation of the bolt until the tumbler is set, the tumbler having a gate presented by rotation of the tumbler to admit a portion of the bolt to intersection of the tumbler in changing the relation of the bolt to the shaft, and said tumbler being constructed to enter into driving relation with the bolt when intersected thereby.

7. A lock-controlled driving connection for a wheel and its shaft, comprising a shaft, a rotary tumbler, and a rotary bolt positioned with its perimeter intersecting both the shaft and the tumbler; said shaft and bolt being each recessed to permit it to receive the periphery of the other for interlocking and releasing the shaft member at will; and said bolt being recessed to receive the tumbler and prevent rotation of the bolt until the tumbler is set; the recess of the bolt being located to receive the tumbler while receiving the shaft and leaving the shaft free; the tumbler being recessed to receive a portion of the bolt when the bolt intersects the shaft; and the tumbler being in driving relation to the bolt and thereby adapted to throw the bolt out of driving relation to the shaft when the tumbler is intersected by the bolt.

8. A lock-controlled driving connection for a shaft and its wheel, comprising a shaft member, a rotary bolt adapted to rotate into intersection with the shaft member to interlock therewith, a tumbler adapted to intersect the bolt to control rotation of the latter, and a push pin for causing the bolt to intersect the shaft member when released by the tumbler.

9. A lock-controlled driving connection for a shaft and its wheel, comprising a shaft member, a rotary bolt adapted to rotate into intersection with the shaft member to interlock therewith, a tumbler adapted to intersect the bolt to control rotation of the latter, and a push pin for causing the bolt to intersect the shaft member when released by the tumbler; said push pin also tripping the bolt into position for driving engagement by the tumbler; and said lock being adapted to enter into such driving relation with the bolt when the tumbler is in releasing position after the push pin has imparted initial movement to the bolt.

10. In a lock-controlled driving connection for a shaft and its wheel, a shaft member, a rotary bolt adapted to intersect the shaft member for interlocking therewith, a rotary tumbler adapted to intersect the rotary bolt to resist rotation of the latter but having a gate which admits a portion of the bolt to intersection with the tumbler when the latter is moved to unlocking position, and a locking pin connection established between the tumbler and bolt during such last-named intersection.

11. In a lock-controlled driving connection for a shaft and its wheel, the combination of a shaft member, a rotary bolt adapted to intersect the shaft member for interlocking therewith, a rotary tumbler adapted to intersect the rotary bolt to control rotation of the latter, and a seating plunger coacting with the rotary bolt to press it to its seat when intersecting the shaft member.

12. In a lock-controlled driving connection for a shaft and its wheel, the combination of a shaft member, a rotary bolt adapted to intersect the shaft member for interlocking therewith, a rotary tumbler adapted to intersect the rotary bolt to control rotation of the latter, and a seating plunger coacting with the rotary bolt to press it to its seat when intersecting the shaft member; said seating plunger being also adapted to intersect the rotary bolt to resist rotation thereof.

Signed at Chicago, Illinois, this 8th day of March, 1920.

THOMAS C. LONNEY.